United States Patent
Didra et al.

(10) Patent No.: US 9,276,296 B2
(45) Date of Patent: Mar. 1, 2016

(54) SENSOR DEVICE AND METHOD FOR DETERMINING A PRESSURE OF A MEDIUM LOCATED INSIDE AN ELECTROCHEMICAL ENERGY STORE, ELECTROCHEMICAL ENERGY STORE, AND METHOD FOR THE MANUFACTURE THEREOF

(71) Applicants: Hans-Peter Didra, Kusterdingen-Jettenburg (DE); Jens Schneider, Leonberg (DE); Fabian Henrici, Stuttgart (DE); Carsten Kaschube, Nuertingen (DE); Remigius Has, Grafenau-Daetzingen (DE)

(72) Inventors: Hans-Peter Didra, Kusterdingen-Jettenburg (DE); Jens Schneider, Leonberg (DE); Fabian Henrici, Stuttgart (DE); Carsten Kaschube, Nuertingen (DE); Remigius Has, Grafenau-Daetzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 13/957,008

(22) Filed: Aug. 1, 2013

(65) Prior Publication Data

US 2014/0038004 A1    Feb. 6, 2014

(30) Foreign Application Priority Data

Aug. 2, 2012 (DE) .......................... 10 2012 213 697

(51) Int. Cl.
*H01M 10/48* (2006.01)
*G01L 9/00* (2006.01)
*H01M 10/04* (2006.01)
*H01G 11/14* (2013.01)

(52) U.S. Cl.
CPC ............... *H01M 10/48* (2013.01); *G01L 9/007* (2013.01); *H01M 10/04* (2013.01); *H01G 11/14* (2013.01); *Y02T 10/7022* (2013.01); *Y10T 29/49108* (2015.01)

(58) Field of Classification Search
CPC .......................... H01M 10/48; H01M 2200/20
See application file for complete search history.

(56) References Cited

U.S. PATENT DOCUMENTS

| | | | |
|---|---|---|---|
| 8,383,256 B1* | 2/2013 | Fu | 429/53 |
| 2011/0192236 A1* | 8/2011 | Doering et al. | 73/862.68 |
| 2011/0236734 A1* | 9/2011 | Ikeda | 429/56 |
| 2012/0024074 A1* | 2/2012 | Zinober et al. | 73/718 |

FOREIGN PATENT DOCUMENTS

DE    10 2009 000 504 A1    8/2010

* cited by examiner

*Primary Examiner* — Stewart Fraser
(74) *Attorney, Agent, or Firm* — Kenyon & Kenyon LLP

(57) ABSTRACT

A sensor device is provided for determining a pressure of a medium located inside a housing of an electrochemical energy storage. The sensor device includes a detection unit which may be or is inductively coupled to an electrically conductive layer, which is deflectable by the pressure of the medium to be determined. The detection unit is designed to inductively detect a distance, which is dependent on the pressure of the medium to be determined, between the layer and the detection unit, to determine the pressure of the medium from the distance.

16 Claims, 5 Drawing Sheets

SENSOR DEVICE AND METHOD FOR DETERMINING A PRESSURE OF A MEDIUM LOCATED INSIDE AN ELECTROCHEMICAL ENERGY STORE, ELECTROCHEMICAL ENERGY STORE, AND METHOD FOR THE MANUFACTURE THEREOF

CROSS REFERENCE

The present application claims the benefit under 35 U.S.C. §119 of German Patent Application No. DE 102012213697.5 filed on Aug. 2, 2012, which is expressly incorporated herein by reference in its entirety.

BACKGROUND INFORMATION

The present invention relates to a sensor device for determining a pressure of a medium located inside an electrochemical energy store, an electrochemical energy store, a method for manufacturing an electrochemical energy store, a method for determining a pressure of a medium located inside an electrochemical energy store, and a corresponding computer program product.

With the demand becoming ever larger for alternative drive concepts for vehicles, the electric drive is entering the focus of consideration more and more. In this case, in particular lithium-ion batteries may in the future become the key technology for modern vehicle drives.

German Patent Application No. DE 10 2009 000 504 A1 describes a battery module, including a number of at least one battery cell and a device for detecting a status of the at least one battery cell.

SUMMARY

In accordance with the present invention provides, an example improved sensor device is provided for determining a pressure of a medium located inside an electrochemical energy store. An example improved electrochemical energy store, an example improved method for manufacturing an electrochemical energy store, an example improved method for determining a pressure of a medium located inside an electrochemical energy store, and an example improved computer program product are also provided.

The present invention provides an example sensor device for determining a pressure of a medium located inside a housing of an electrochemical energy store. The example sensor device includes the following feature:

a detection unit, which may be or is inductively coupled to an electrically conductive layer, which is deflectable by the pressure of the medium to be determined, the detection unit being designed to inductively detect a distance, which is dependent on the pressure of the medium to be determined, between the layer and the detection unit, in order to determine the pressure of the medium from the distance.

The electrochemical energy store may be an electrical or electrochemical secondary cell, a battery cell, a battery, or an accumulator. The electrochemical energy store may be part of a so-called battery pack having a plurality of electrochemical energy stores or battery cells, for example, for an electric vehicle or the like. The housing of the electrochemical energy store may be or may become hermetically sealed. The housing of the electrochemical energy store may be designed to isolate an electrochemical reaction device of the electrochemical energy store with respect to the surroundings. The housing of the electrochemical energy store may be designed to be gas-tight and water-tight. The medium may be a gas, a gas mixture, a liquid, a liquid mixture, or a gas-liquid mixture, in general a fluid. In particular, the medium may be formed by or contain gases in the interior of a battery cell or an electrochemical energy store of a vehicle or the like, for example. The detection unit may be an electric coil having at least one winding. The electrically conductive layer may be formed with the aid of deposition of an electrically conductive material or doping using an electrically conductive material. The electrically conductive layer may be produced in the form of a coherent material element or a continuous material layer. The electrically conductive layer may be part of a diaphragm of the electrochemical energy store, in particular a bursting diaphragm or the like, in this case. Alternatively, the electrically conductive layer may be shaped in the form of a diaphragm of the electrochemical energy store, in particular a bursting diaphragm or the like. The electrically conductive layer may therefore be shaped as an electrically conductive diaphragm, in particular an electrically conductive bursting diaphragm. The sensor device and/or the electrically conductive layer or a protective layer applied over it may have a material which is chemically resistant in the event of a contact with the medium within a service life of the sensor device, the electrically conductive layer, or the protective layer. The electrically conductive layer may also have a ferromagnetic property.

An inductive coupling is producible between the electrically conductive layer and the detection unit. The electrically conductive layer and the detection unit may be able to be arranged or may be arranged at a starting distance with respect to one another in the case of a starting pressure. If the starting pressure changes, the starting distance between the electrically conductive layer and the detection unit may also change. The distance between the electrically conductive layer and the detection unit may decrease or increase in the event of a pressure change of the medium in this case. The distance or a distance change of the distance between the electrically conductive layer and the detection unit may be detected in this case with the aid of an eddy current measurement. The foundation of an eddy current measuring principle is a change of an inductance of a detection unit or a coil due to eddy currents induced by the coil itself or a further coil in the electrically conductive layer or in the conductive test specimen. These eddy currents generate a magnetic counter field. A distance between the detection unit or the coil and the electrically conductive layer or the electrically conductive test specimen may be deduced via a detection of a change of the inductance of the detection unit or the coil. A pressure determination based on the distance may be carried out in an analysis unit separate from the detection unit.

In other words, the basic principle of the eddy current measuring principle is based on the induction effect of eddy currents, which are induced in the electrically conductive layer or an electrically conductive test specimen. The detection unit or the coil is powered with alternating current for this purpose, upon which a magnetic field forms around the coil or the detection unit. If an electrically conductive object, i.e., the electrically conductive layer here, is located in this magnetic field, eddy currents therefore arise therein according to the Faraday induction law. The eddy currents are in turn enclosed by a magnetic field. The intrinsic field of these eddy currents counteracts the field of the coil in accordance with Lenz's law, which results in a change of the coil impedance. This distance-dependent impedance change may be detected metrologically. A deformation of a macroscopic diaphragm, which has or forms the electrically conductive layer, is used to determine the pressure change of the medium. This diaphragm deforms in the event of a difference between the pressure in the interior of the housing of the electrochemical energy store and the ambient pressure. Such a differential pressure may be read out in a contactless way via inductive coupling in this case via the distance change of the diaphragm to the detection unit or the coil. The detection unit or the eddy current coil may be manufactured in circuit board design or as a stamped part, for example. The coil is positioned at a predetermined distance to the pressure-sensitive diaphragm. Not only may the impedance of the coil, which is dependent on the distance of the coil to the diaphragm, be used as the detection signal or analysis signal, but rather the option also exists of determining the resonant frequency of the oscillating circuit formed by the coil inductance and the parasitic capacitance between the windings, which may be interfered with by the pressure influence.

The present invention also provides an example electrochemical energy store, which has a housing, inside which a medium may be released by an electrochemical reaction device. The example electrochemical energy store includes the following features:

a diaphragm, with the aid of which a pressure relief opening of the housing is closed, the diaphragm having an electrically conductive layer and being designed to burst in a defined way in the event of a predetermined overpressure of the medium in the housing to discharge the medium through the pressure relief opening; and a variant of the above-mentioned sensor device, which is situated in an area of inductive coupling with respect to the electrically conductive layer.

In conjunction with the example electrochemical energy store, a variant of the sensor device presented here may advantageously be used or employed to determine a pressure of the medium located inside the housing of the electrochemical energy store. The pressure relief opening is a passage opening through a wall of the housing. The pressure relief opening may represent a fluid connection, which is closable with the aid of the diaphragm, between an interior of the housing of the electrochemical energy store and the surroundings. The diaphragm may be a so-called bursting diaphragm or another pressure relief diaphragm. The diaphragm may be part of an overcharge safety device, a so-called OSD, which is situated at the pressure relief opening. The sensor device may be situated integrated into the overcharge safety device in this case. The diaphragm may elastically deform up to the predetermined overpressure and tear or burst upon reaching the predetermined overpressure. More precisely, the diaphragm may be designed to burst in a defined way when a predetermined differential pressure is exceeded between a housing interior pressure and an ambient pressure. The predetermined overpressure may correspond to reaching a safety-critical state of the electrochemical energy store, this safety-critical state being able to be counteracted by discharging the medium through the pressure relief opening.

The present invention also provides an example method for manufacturing an electrochemical energy store. The example method includes the following:

providing a housing, inside which a medium may be released by an electrochemical reaction device, the housing having a pressure relief opening which is closed with the aid of a diaphragm, the diaphragm having an electrically conductive layer and being designed to burst in a defined way when a predetermined overpressure of the medium is exceeded in the housing to discharge the medium through the pressure relief opening; and situating a variant of the above-mentioned sensor device in an area of inductive coupling with respect to the electrically conductive layer.

By carrying out the example method for manufacturing, a variant of the advantageous sensor device presented here may be manufactured. In the step of situating, the sensor device may be situated in the area of inductive coupling with respect to the electrically conductive layer in such a way that under normal pressure conditions, the detection unit is situated at a predetermined distance from the electrically conductive layer.

Furthermore, the present invention provides an example method for determining a pressure of a medium located inside an electrochemical energy store. The example method includes the following:

applying the medium to an electrically conductive layer, which is deflectable by the pressure of the medium to be determined; and detecting a distance, which is dependent on the pressure of the medium to be determined, between the electrically conductive layer and a detection unit, which is inductively coupled to the electrically conductive layer, with the aid of the detection unit in an inductive way, to determine the pressure of the medium from the distance.

In conjunction with the example method for determining, a variant of the sensor device presented here may advantageously be used or employed to determine a pressure of the medium located inside the housing of the electrochemical energy store. The method may also have a step of analyzing the detected distance to determine the pressure of the medium.

A computer program product may also be advantageous, which has program code, which is stored on a machine-readable carrier such as a semiconductor memory, a hard drive memory, or an optical memory and is used to carry out a variant of the above-mentioned method for determining when the program product is executed on a computer or a device.

According to specific example embodiments of the present invention, an advantageous eddy current pressure sensor principle may be provided for electrochemical energy stores, such as batteries, battery cells, in particular prismatic battery cells equipped with a bursting diaphragm and/or an overcharge safety device (OSD), or the like. With respect to electrochemical energy stores, aging in the case of lithium-ion batteries is significant insofar as such aging results in a capacitance loss of the battery, for example. This aging process begins as soon as the battery is manufactured. Since, for example, lithium-ion cells are enveloped gas-tight, during aging-related outgassing processes, for example, due to decomposition of the electrolyte, an overpressure of the medium arises in the electrochemical energy store. This overpressure may be used as a secondary variable for determining the aging state (SOH, state of health) of the electrochemical energy store. A pressure sensor, which is attached outside the medium area of the medium located in the interior of the electrochemical energy store, for example, in the form of a contactless eddy current sensor according to specific embodiments of the present invention, may take over this monitoring. According to specific embodiments of the present invention, an eddy current coil or the eddy current principle is used to measure the prevailing pressure of a medium in an electrochemical energy store.

One advantage of the example embodiments of the present invention is a simple construction of the eddy current sensor. The detection unit and the electrically conductive layer or diaphragm, which induces the eddy current losses, do not have to be electrically connected to one another. Therefore, such sensors are also implementable cost-effectively. Furthermore, there is no design intervention in the structure of the electrochemical energy store, i.e., an implementation of the eddy current principle for measuring the prevailing pressure of the medium in the electrochemical energy store is very simple. Another advantage of the pressure measurement according to specific embodiments of the present invention is that the eddy current sensor is not exposed to the medium or the gas atmosphere of the electrochemical energy store, and therefore no medium resistance of the sensor device is necessary. Furthermore, an increase of the safety of the electrochemical energy store is advantageous. Thus, incidents or safety-critical states of the electrochemical energy store, i.e., if the electrochemical energy store is exposed, for example, to extreme external influences, such as extreme heat, overcharge, mechanical deformations, or the like, for which it was not originally designed, may be detected earlier. As a result of the detection of the pressure conditions, countermeasures may also be initiated in a timely manner, before, for example, spontaneous exothermic reactions are triggered, which could result in the worst case in the ignition or explosion of the battery. As a result of the detection of the pressure conditions, controllable rapid charging and discharging of the electrochemical energy store are also possible. Using the eddy current sensor principle according to specific embodiments of the present invention, rapid and also high-resolution embodiments may also be implemented in practice. A measuring signal of the eddy current sensor concept according to specific embodiments of the present invention is insensitive with respect to dirt, dust, moisture, oil, and the like and is also relatively interference-free in the electromagnetic surroundings. The devices and methods according to specific embodiments of the present invention are usable in the case of all electrically conductive materials of the electrically conductive layer. Since eddy currents penetrate insulators unobstructed, even metals behind an insulating layer may be used as a measured object or an electrically conductive layer. According to specific embodiments of the present invention, statements about the aging state (SOH, state of health) of the electrochemical energy store may be made, since worsening of the electrochemical properties and therefore degassing processes change the pressure in the electrochemical energy store over time, for example, after many charge cycles or due to possible irreversible damage of the electrochemical energy store.

According to one specific embodiment of the sensor device, a support element may be provided for supporting the detection unit. In this case, the support element may have a circuit board and additionally or alternatively a plastic plate. The support element may have a media passage opening. The detection unit may be situated enclosing the media passage opening. The media passage opening may be shaped in the form of a through opening through the support element. The support element may be designed to be attached to the housing or another section of the electrochemical energy store. In particular, the support element may be designed to be attached spanning a bursting diaphragm of the electrochemical energy store. If the support element is attached to the housing or another section of the electrochemical energy store so that it spans the diaphragm of the electrochemical energy store, in the event of pressure-related bursting of the bursting diaphragm, the medium may escape through the media passage opening of the support element. Such a specific embodiment offers the advantage that the detection unit may be situated securely and precisely at a defined distance to the electrically conductive layer with the aid of the support element. Furthermore, a pressure relief function of a bursting diaphragm is maintained due to the existing media passage opening of the support element. In an alternative specific embodiment, the support element may also be formed without the media passage opening.

An analysis unit, which is electrically connected to the detection unit, for analyzing the distance detected with the aid of the detection unit may also be provided to determine the pressure of the medium. The analysis unit may have an electronic assembly having an electrical circuit, for example, an application-specific integrated circuit (ASIC) or the like. Such a specific embodiment offers the advantage that the pressure of the medium may be determined precisely and reliably based on the distance or a distance change.

The analysis unit and the detection unit may be situated in this case in a shared circuit housing and additionally or alternatively may be situated on a shared circuit board. Therefore, a shared circuit board may also represent a support element for the detection unit. The shared circuit housing may have a plastic, a casting compound or a molding compound, or the like, the analysis unit and the detection unit being packaged or embedded or housed in the housing. In particular, the analysis unit and the detection unit may be jointly embedded or able to be embedded. The circuit housing may be a housing of the analysis unit, into which the detection unit is integrated. The detection unit may also be situated on a circuit board, which is part of the analysis unit or on which the analysis unit is also situated. Such a specific embodiment offers the advantage that the detection unit is protected from environmental influences in a housing or may be connected to the analysis unit on a circuit board in a simple way with the aid of printed conductors intrinsic to the circuit board.

According to one specific embodiment of the electrochemical energy store, the sensor device may be fastened around the pressure relief opening and additionally or alternatively around the diaphragm with respect to the electrically conductive layer with the aid of a connection which fails in the event of a pressure lower than or equal to the predetermined overpressure of the medium. The sensor device may have a support element for supporting the detection unit. In this case, the support element may have a circuit board and additionally or alternatively a plastic plate. The connection between the sensor device or the support element and the housing or another section of the electrochemical energy store may have or represent a pressure-dependent predetermined breaking point. Such a specific embodiment may offer the advantage that in the event of bursting of the diaphragm at the predetermined overpressure of the medium, the sensor device safely disconnects from the housing of the electrochemical energy store to allow an escape of the medium. Therefore, a pressure relief function of the diaphragm or bursting diaphragm of the electrochemical energy store is maintained due to the connection which fails depending on the pressure.

The sensor device may also be fastened around the pressure relief opening and additionally or alternatively around the diaphragm with respect to the electrically conductive layer with the aid of at least one spacer element which is permeable to the medium. The sensor device may have a support element for supporting the detection unit. The support element may have a circuit board and additionally or alternatively a plastic plate in this case. The connection between the sensor device or the support element and the housing or another section of the electrochemical energy store may be established with the aid of the at least one spacer element. The at least one spacer element may have a porous material, which is permeable to the medium. Such a specific embodiment offers the advantage that in the event of bursting of the diaphragm at the predetermined overpressure of the medium, the medium may reliably escape through the permeable or porous spacer element. A pressure relief function of the diaphragm or bursting diaphragm of the electrochemical energy store is thus maintained due to the medium-permeable spacer element.

Furthermore, a further electrically conductive layer and a further sensor device may be provided, which is arranged in an area of inductive coupling with respect to the further electrically conductive layer. The further electrically conductive layer may be separated from the medium. The further electrically conductive layer may also deflectable by an ambient pressure. The sensor device may be constructed redundantly in this case, i.e., for example, the further electrically conductive layer and the further sensor device may be situated at positions where no medium-related deformation of the electrically conductive layer occurs. Using such a redundant or differential sensor construction, it is possible to also take into consideration or compensate for cross-influences such as the temperature and the like in the pressure determination.

In addition, the electrochemical energy store may have a plurality of battery cells and the sensor device may have a plurality of detection units and one analysis unit. One of the plurality of detection units may be attached to each of the plurality of battery cells. In this case, the analysis unit may be electrically connected to the plurality of detection units. Each of the battery cells of the electrochemical energy store may have an electrically conductive layer in this case, which is deflectable by the medium pressure. In each case one of the plurality of detection units may be situated in an area of inductive coupling with respect to an electrically conductive layer of one of the battery cells in each case. Such a specific embodiment offers the advantage that also in so-called battery packs having a plurality of battery cells as subunits of the electrochemical energy store, a pressure measurement of the medium is possible in all cells with minor effort and in a space-saving way.

BRIEF DESCRIPTION OF THE DRAWINGS

The present invention will be explained in greater detail on the basis of the figures.

DETAILED DESCRIPTION OF EXAMPLE EMBODIMENTS

Figure 1A:
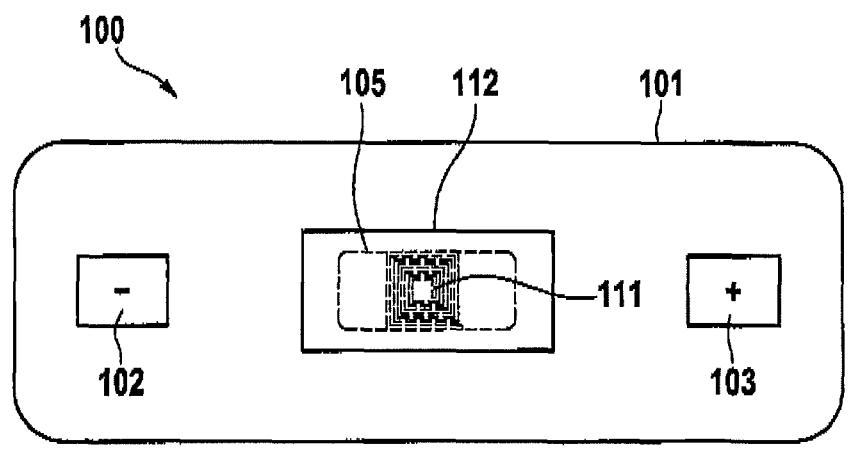
FIGS. 1A through 6 show views of electrochemical energy stores having sensor devices according to exemplary embodiments of the present invention in a top view, in a sectional view, or as a perspective view.

In the following description of preferred exemplary embodiments of the present invention, identical or similar reference numerals are used for the similarly acting elements shown in the various figures, a repeated description of these elements being omitted.

FIG. 1A shows a schematic top view of an electrochemical energy store having a sensor device according to one exemplary embodiment of the present invention. Electrochemical energy store 100, a housing 101, a first electrode 102, which is symbolically provided with a minus sign, a second electrode 103, which is symbolically provided with a plus sign, a diaphragm 105 or a bursting diaphragm, a detection unit 111 in the form of an electric coil, and a support element 112 in the form of a circuit board are shown. Detection unit 111 or coil and support element 112 are part of a sensor device for determining a pressure of a medium located inside housing 101 of electrochemical energy store 100, the sensor device not explicitly being provided with reference numerals in FIG. 1A.

The two electrodes 102 and 103, which are part of an electrochemical reaction device (not explicitly shown), are situated inside housing 101 of electrochemical energy store 100. Furthermore, housing 101 of electrochemical energy store 100 is designed to envelop a medium, which is located inside housing 101 and is related to the electrochemical reaction device, in a fluid-tight way. Housing 101 of electrochemical energy store 100 has a pressure relief opening, which is sealed or closed with the aid of bursting diaphragm 105, for a medium exit in the case of overpressure. Bursting diaphragm 105 is only indicated in the view of FIG. 1A, since bursting diaphragm 105 is covered by support element 112 of the sensor device. Bursting diaphragm 105 has an electrically conductive material or an electrically conductive layer. Detection unit 111 is situated on support element 112. In particular, detection unit 111 is situated on or in a section of support element 112 overlaying bursting diaphragm 105.

Figure 1B:
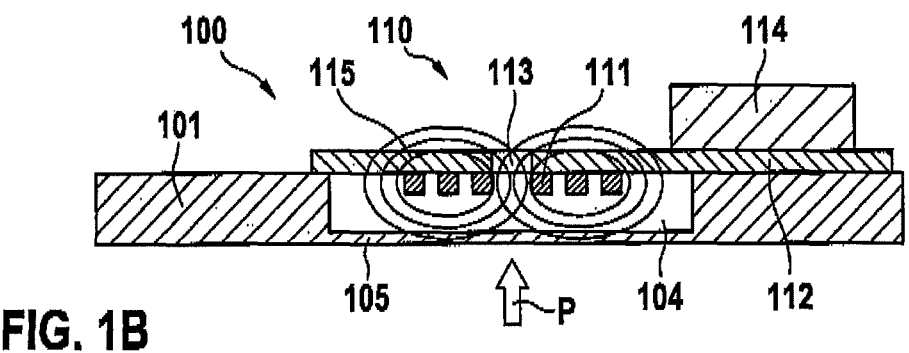

FIG. 1B shows a schematic sectional view of a subsection of an electrochemical energy store having a sensor device according to one exemplary embodiment of the present invention. The electrochemical energy store may be the electrochemical energy store from FIG. 1A. The sensor device may be the sensor device from FIG. 1A. Electrochemical energy store 100, a housing 101, a pressure relief opening 104, a bursting diaphragm 105, sensor device 110, detection unit 111 in the form of an electric coil having three windings, for example, a support element 112 in the form of a circuit board, a media passage opening 113, an analysis unit 114 in the form of an electrical circuit, in particular an application-specific integrated circuit (ASIC), a symbolically shown area of inductive coupling 115 or an H field, i.e., a field of magnetic field strength H and a pressure P or pressure increase of a medium symbolically shown by an arrow, which is situated in an interior of electrochemical energy store 100 enclosed by housing 101, are shown. Sensor device 110 has detection unit 111, support element 112, media passage opening 113, and analysis unit 114.

Housing 101 of electrochemical energy store 100 has pressure relief opening 104, which extends in the form of a through opening through housing 101 from a surface of housing 101, which faces toward the medium or faces away from the surroundings, up to a surface of housing 101, which faces away from the medium or faces toward the surroundings. Pressure relief opening 104 is closed or sealed at an end thereof, which faces toward the medium or faces away from the surroundings, with the aid of bursting diaphragm 105. Bursting diaphragm 105 is situated in contact with the medium. Bursting diaphragm 105 is designed to elastically deform or deflect up to a critical differential pressure between medium pressure or pressure P and an ambient pressure and to burst above the critical differential pressure, so that a pressure drop of the medium into the surroundings of electrochemical energy store 100 may take place. Bursting diaphragm 105 may be integrated into housing 101 or may be connected to housing 101 as a separate component. Pressure relief opening 104 is covered at an end thereof which faces away from the medium or faces toward the surroundings with the aid of support element 112 of sensor device 110.

Support element 112 of sensor device 110 is situated on the surface of housing 101 facing away from the medium or facing toward the surroundings. Detection unit 111 and analysis unit 114 are situated on support element 112. Furthermore, support element 112 has media passage opening 113. Media passage opening 113 extends in the form of a through opening through support element 112 from a surface of support element 112 facing toward the medium or facing away from the surroundings up to a surface of support element 112 facing away from the medium or facing toward the surroundings. Detection unit 111 or the electric coil is situated enclosing media passage opening 113 according to the exemplary embodiment of the present invention shown as an example in FIG. 1B. Detection unit 111 is situated on the surface of support element 112 facing toward the medium or facing away from the surroundings. Bursting diaphragm 105 is situated in the area of inductive coupling 115 of detection unit 111. Analysis unit 114 is situated on the surface of support element 112 facing away from the medium or facing toward the surroundings. Analysis unit 114 is spaced apart laterally with respect to detection unit 111 and media passage opening 113. Although it is not shown in FIG. 1B, detection unit 111 and analysis unit 114 are thus electrically connected to one another.

Figure 1C:
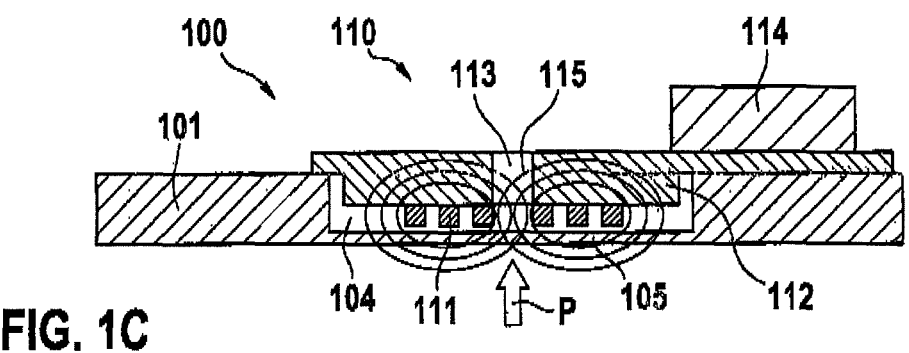

FIG. 1C shows a schematic sectional view of a subsection of an electrochemical energy store having a sensor device according to one exemplary embodiment of the present invention. The view in FIG. 1C corresponds to the view from FIG. 1B and electrochemical energy store 100 and sensor device 110 in FIG. 1C correspond to the electrochemical energy store and the sensor device from FIG. 1B with the exception that in FIG. 1C, support element 112 of sensor device 110 is formed differently. More precisely, support element 112 has a projection section protruding toward bursting diaphragm 105, in the area of which media passage opening 113 is formed and detection unit 111 is situated. Therefore, a distance between detection unit 111 and bursting diaphragm 105 is less in FIG. 1C than in FIG. 1B.

In FIGS. 1A through 1C, electrochemical energy store 100 and sensor device 110 or a sensor construction are shown in a top view and in a sectional view. Sensor or sensor device 110 includes a coil or detection unit 111, which is positioned above a pressure-sensitive diaphragm 105, in a preferred variant bursting diaphragm 105 being made of iron, aluminum, or steel plate, for example, of electrochemical energy store 100 or a battery. As a function of a difference between cell internal pressure or medium pressure P and the ambient pressure or external pressure (atmospheric pressure), bursting diaphragm 105 deforms, whereby a distance between detection unit 111 and conductive surface or diaphragm 105 changes, which is in turn detected by an electrical or electronic measurement with the aid of analysis unit 114. A measuring range may cover a minimum and maximum pressure prevailing inside electrochemical energy store 100, from 0 bar up to a burst pressure of diaphragm 105, which may generally be approximately 8 bar to 10 bar, under routinely occurring atmospheric pressure conditions of generally 0.5 bar to 1.5 bar. A differential pressure measuring range should therefore include 1.5 bar to 10.5 bar. A lower measurement precision requirement may apply for boundary ranges. A precision in the core range between 0 bar and 6 bar should preferably have deviations of less than 1%. The exact distance between diaphragm 105 and detection unit 111 is significant in this case, since a change directly results in a sensor signal.

In one variant of the pressure detection in accordance with the present invention, sensor device 100 detects the deformation of electrically conductive diaphragm 105. In another variant of the presented pressure detection concept, the sensor device detects the deformation of a ferromagnetic diaphragm 105. Both conductivity and also ferromagnetism may either be inherently a property of diaphragm 105 or may also be produced by further processing, e.g., coating. Possible materials for diaphragm 105 and a coating are aluminum, iron, nickel, and the like. In one variant of the presented pressure detection concept, detection unit 111 is installed as an electric coil on support element 112, which is designed in the form of a circuit board, but stamped coils on a plastic support or the like may also be used. FIG. 1B and FIG. 1C show a sectional view of a subsection of electrochemical energy store 100, a coil or detection unit 111 being located on a circuit board or support element 112 outside bursting diaphragm 105. Sensor device 110 is therefore designed to be an eddy current sensor. In the event of a pressure increase P in the interior of electrochemical energy store 100, the distance of detection unit 111 to bursting diaphragm 105 and therefore the induced eddy currents in diaphragm 105 change. This change may be detected via analysis unit 114.

Figure 2A:
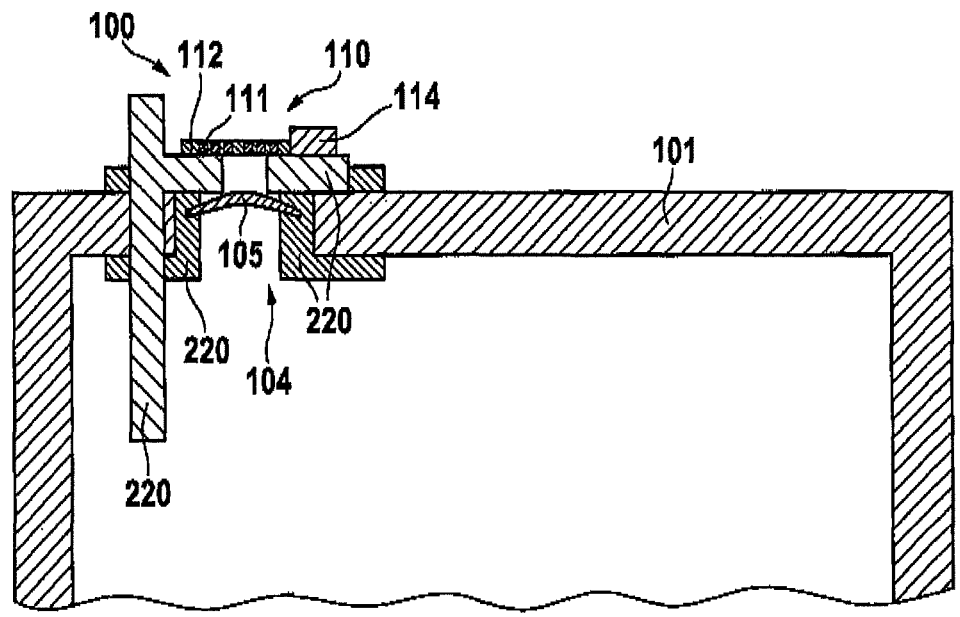

FIG. 2A shows a schematic sectional view of a subsection of an electrochemical energy store having a sensor device according to one exemplary embodiment of the present invention. The electrochemical energy store may be the electrochemical energy store similar to that from one of FIGS. 1A through 1C. The sensor device may be the sensor device similar to that from one of FIGS. 1A through 1C. The view in FIG. 2A corresponds to the view from FIG. 1B with the exception that in FIG. 2A, a larger subsection of housing 101 of electrochemical energy store 100 is shown, diaphragm 105 is embodied differently, detection unit 111 is situated in support element 112, and an overcharge safety device (OSD) 220, to which diaphragm 105, support element 112, and analysis unit 114 are attached, is situated in the area of pressure relief opening 104. Furthermore, for reasons of space, media passage opening 113 of support element 112 and the symbolically shown area of inductive coupling 115 are not shown in FIG. 2A. Housing 101 is an aluminum housing, for example.

Overcharge safety device 220 is attached to surfaces of housing 101 in the area of pressure relief opening 104 and to housing 101 in areas adjacent to pressure relief opening 104. In this case, overcharge safety device 220 is designed to seal pressure relief opening 104 in the case of normal operation of electrochemical energy store 100 to discharge a medium overpressure, which arises in the event of electrical overcharge of electrochemical energy store 100, in the interior of housing 101. Diaphragm 105 is associated with overcharge safety device 220 according to the exemplary embodiment of the present invention shown in FIG. 2A and is anchored in overcharge safety device 220 to close pressure relief opening 104. In this case, diaphragm 105 is a so-called OSD diaphragm made of bimetal. Diaphragm 105 is situated in contact with the medium. Support element 112 and analysis unit 114 are attached to a surface of overcharge safety device 220 facing toward the surroundings or facing away from the medium. Detection unit 111 is situated embedded in support element 112, for example.

Figure 2B:
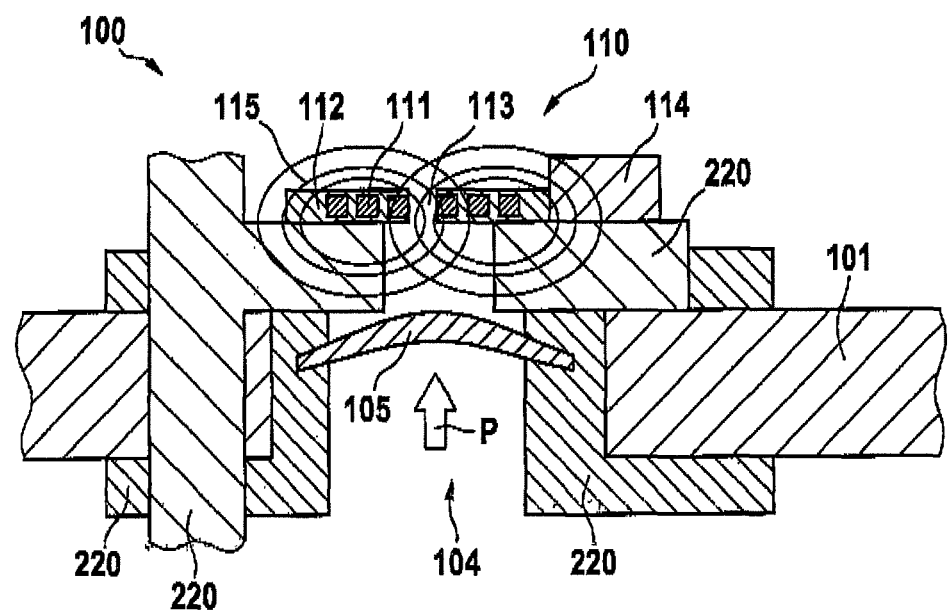

FIG. 2B shows a schematic sectional view of a subsection of an electrochemical energy store having a sensor device according to one exemplary embodiment of the present invention. More precisely, FIG. 2B shows a detail from FIG. 2A in an enlarged view. In FIG. 2B, in addition to FIG. 2A, media passage opening 113 of support element 112, the area of inductive coupling 115, and pressure P of the medium are shown.

Therefore, FIG. 2A and FIG. 2B show an electrochemical energy store 100 or a battery cell having an overcharge safety device 220. Sensor device 110 or the eddy current sensor may be integrated or partially integrated into overcharge safety device 220, for example. A position of diaphragm 105 may be read out via detection unit 111. A signal analysis of a detection signal may be implemented with the aid of analysis unit 114 in the form of an ASIC or discrete electronics on a circuit board. One option is the integration of sensor device 110 or the eddy current differential pressure sensor into overcharge safety device 220. In this case, sensor device 110 is not directly exposed to the medium or a gas atmosphere in the interior of electrochemical energy store 100 and accordingly does not need to have any substantial medium resistance. In another exemplary embodiment of the present invention, detection unit 111 and optionally also analysis unit 114 are integrated into or embedded directly in a plastic housing of overcharge safety device 220.

Figure 3A:
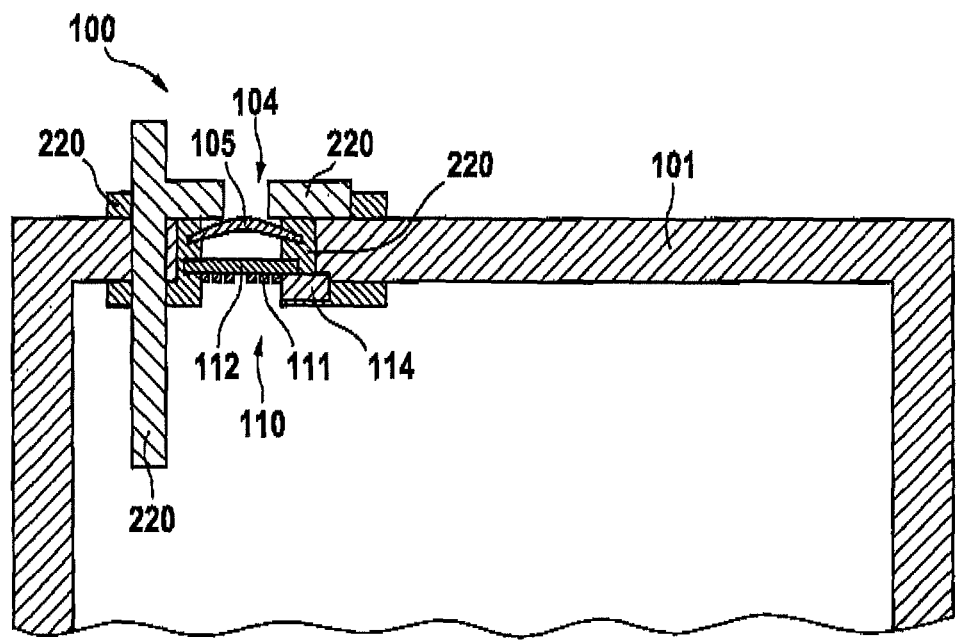

FIG. 3A shows a schematic sectional view of a subsection of an electrochemical energy store having a sensor device according to one exemplary embodiment of the present invention. The view in FIG. 3A corresponds to the view from FIG. 2A and electrochemical energy store 100 and sensor device 110 in FIG. 3A correspond to the electrochemical energy store and the sensor device from FIG. 2A with the exception that sensor device 110, instead of being situated outside as in FIG. 2A, is now situated in FIG. 3A inside the interior of housing 101, which is closed by diaphragm 105, in the area of pressure relief opening 104, detection unit 111 is situated on a surface of support element 112 facing toward the medium or facing away from the surroundings, and analysis unit 114 is embedded in overcharge safety device 220. According to the exemplary embodiment of the present invention shown in FIG. 3A, sensor device 110 is therefore located inside the interior of housing 101, which is closed by diaphragm 105, and is not directly exposed to the medium or a gas atmosphere in the interior of electrochemical energy store 100, so that the sensor device accordingly does not need to have any substantial medium resistance.

Figure 3B:
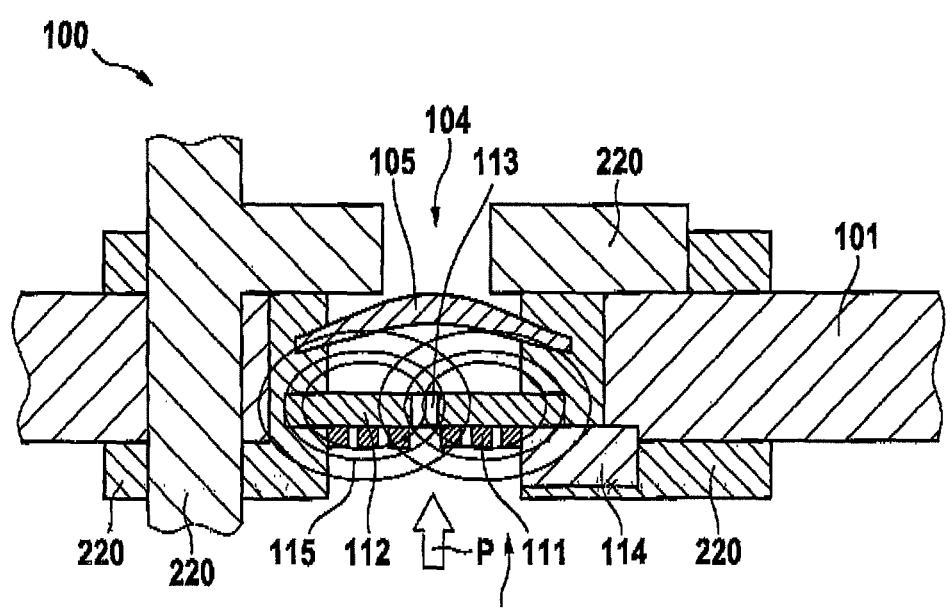

FIG. 3B shows a schematic sectional view of a subsection of an electrochemical energy store having a sensor device according to one exemplary embodiment of the present invention. More precisely, FIG. 3B shows a detail from FIG. 3A in an enlarged view. In FIG. 3B, in addition to FIG. 3A, media passage opening 113 of support element 112, the area of inductive coupling 115, and pressure P of the medium are shown.

In the design of an electrochemical energy store having a sensor device according to exemplary embodiments of the present invention, it should be ensured that a cross section for an exit of the medium from the diaphragm or from the interior of the housing closed by the diaphragm is maintained sufficiently that an exit of the medium is still possible in a safety-critical state of the electrochemical energy store. In addition to the approach shown in FIGS. 1B through 3B including the media passage opening in the support element of the sensor device, other approaches are also possible. The following figures are also to be understood as schematic. In addition, as in the preceding figures, the analysis unit does not need to be attached to the support element.

Figure 4:
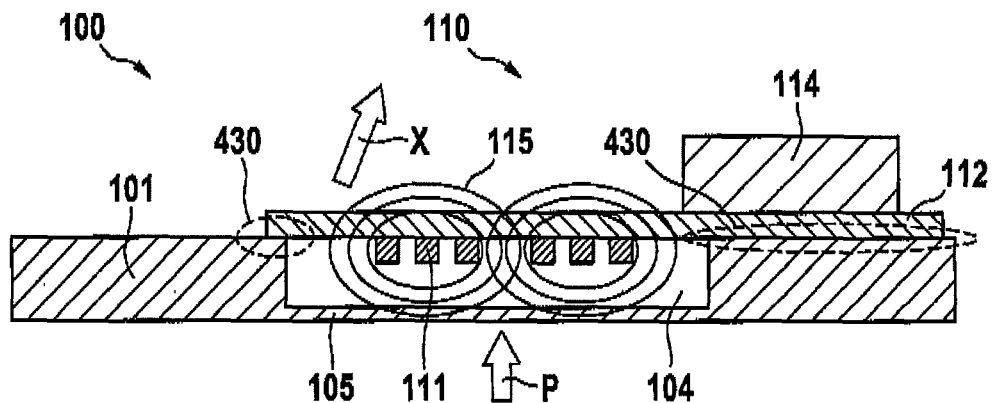

FIG. 4 shows a schematic sectional view of a subsection of an electrochemical energy store having a sensor device according to one exemplary embodiment of the present invention. The view in FIG. 4 corresponds to the view from FIG. 1B and electrochemical energy store 100 and sensor device 110 in FIG. 4 correspond to the electrochemical energy store and the sensor device from FIG. 1B with the exception that in FIG. 4, support element 112 of sensor device 110 does not have a media passage opening, but rather is attached to housing 101 of electrochemical energy store 100 in a joining area 430 with the aid of a defined or a defined failing join connection, which allows a tear-away X, symbolically shown by an arrow, of support element 112 from housing 101 if gas or medium exits through bursting diaphragm 105.

Support element 112 or the circuit board does not provide a media passage opening or ventilation opening. Instead, the attachment of support element 112 to housing 101 of electrochemical energy store 100 is designed so that in the event of bursting of diaphragm 105 and increase of the gas pressure in an intermediate space between bursting diaphragm 105 and support element 112, the support element tears off and the medium may flow out. The join connection may be a glued connection or a clamp connection, for example. It may be designed for a tear-away overpressure of approximately 1 bar, which permits a sufficiently robust connection and also reliable tearing away. Fundamentally, tear-away pressures up to a design pressure of bursting diaphragm 105 are conceivable. The exemplary embodiment of the present invention shown in FIG. 4 may also be used in conjunction with an overcharge safety device (OSD).

Figure 5:
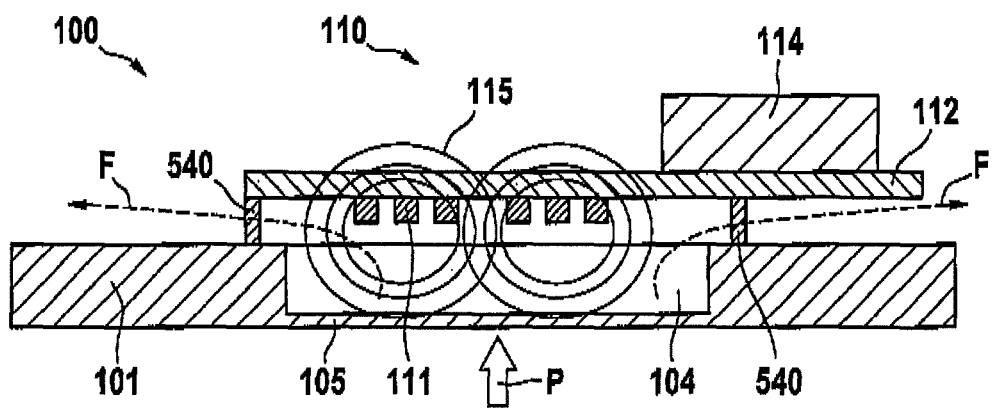

FIG. 5 shows a schematic sectional view of a subsection of an electrochemical energy store having a sensor device according to one exemplary embodiment of the present invention. The view in FIG. 5 corresponds to the view from FIG. 1B and/or FIG. 4 and electrochemical energy store 100 and sensor device 110 in FIG. 5 correspond to the electrochemical energy store and the sensor device from FIG. 1B and/or FIG. 4 with the exception that in FIG. 5, support element 112 of sensor device 110 does not have a media passage opening or is attached without a defined failing join connection to housing 101, but rather is attached to housing 101 with the aid of at least one spacer 540, which is permeable to the medium. Therefore, support element 112 does not have a media passage opening and is indirectly fastened to housing 101 via two medium-permeable spacers 540, which are shown in the view, a sufficient medium exit F being provided between housing 101 and support element 112 if diaphragm 105 bursts.

Figure 6:
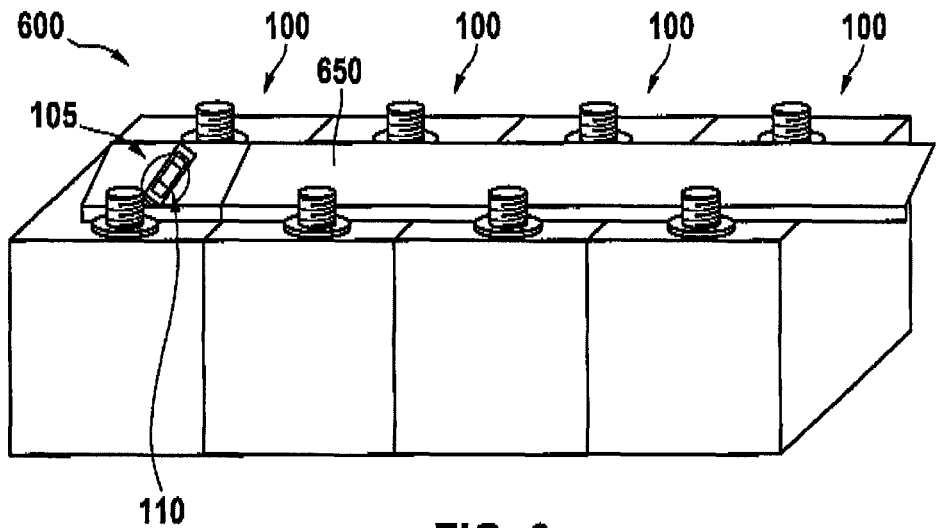

FIG. 6 shows a schematic view of an electrochemical energy store having a sensor device according to one exemplary embodiment of the present invention. The electrochemical energy store is designed to be a so-called cell module or a so-called battery pack, which has, for example, four electrochemical energy stores 100, such as the electrochemical energy stores from one of FIGS. 1A through 5 as modular subunits or battery cells. Diaphragm 105 of only one battery cell 100 is shown in the view, although all battery cells 100 in FIG. 6 have a diaphragm 105. In addition, one sensor device 110, like the sensor device from one of FIGS. 1A through 5, is shown, only a part of sensor device 110 being visible in FIG. 6 because of the view. Although it is not explicitly shown, one detection unit of sensor device 110 is situated in each case in the area of diaphragm 105 of each one of battery cells 100. Furthermore, at least one analysis unit of sensor device 110 is provided. Therefore, either one detection unit and one analysis unit are assigned to each of battery cells 100 or one detection unit is assigned to each of battery cells 100 and one analysis unit is provided for all detection units. Battery cells 100 are situated adjoining one another in a row to form a cell module 600 or battery pack. Cell module 600 has a cover element 650 to form a discharge channel, which extends over all diaphragms 105 of battery cells 100 and is designed to intentionally drain or discharge medium from battery cells 100 if at least one of diaphragms 105 bursts. Cover element 650 may be a plastic part. Sensor device 110 is integrated according to the exemplary embodiment of the present invention shown in FIG. 6 into the discharge channel formed by cover element 650 and the housing of battery cells 100.

As an example, a cell module 100 including four battery cells 100 is shown in FIG. 6. Alternatively, 6 to 10 battery cells 100 are frequently provided. The shared discharge channel is used for the discharge of medium possibly escaping from battery cells 100. Eddy current sensor or sensor device 110 may be integrated into the shared discharge channel for all battery cells 100 of a cell module 600. One detection unit is integrated in each case into the discharge channel at corresponding points above bursting diaphragms 105 of each battery cell 100. It is also conceivable that the discharge channel is installed directly onto a large circuit board as a shared support element of sensor device 110, which then supports multiple detection units. These detection units may be analyzed via a shared analysis unit in the form of an ASIC or a discrete analysis circuit; wiring may also be provided from the discharge channel to central monitoring or analysis electronics on the module or battery level.

Figure 7:
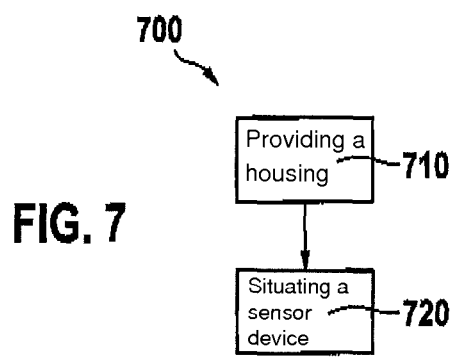
FIGS. 7 and 8 show flow charts of methods according to exemplary embodiments of the present invention.

FIG. 7 shows a flow chart of a method 700 for manufacturing an electrochemical energy storage according to one exemplary embodiment of the present invention. Method 700 has a step of providing 710 a housing, inside which a medium may be released by an electrochemical reaction device. The housing has a pressure relief opening, which is closed with the aid of a diaphragm. In this case, the diaphragm has an electrically conductive layer and is designed to burst in a defined way in the event of a predetermined overpressure of the medium in the housing to discharge the medium through the pressure relief opening. Method 700 also has a step of situating 720 a sensor device in an area of inductive coupling with respect to the electrically conductive layer. The sensor device is provided for determining a pressure of a medium located inside a housing of an electrochemical energy store. The sensor device has a detection unit, which may be inductively coupled or is coupled to the electrically conductive layer, which is deflectable by the pressure of the medium to be determined. The detection unit is designed to inductively detect a distance, which is dependent on the pressure of the medium to be determined, between the layer and the detection unit, to determine the pressure of the medium from the distance. With the aid of method 700, for example, an electrochemical energy store having a sensor device from FIGS. 1A through 6 may advantageously be manufactured.

Figure 8:
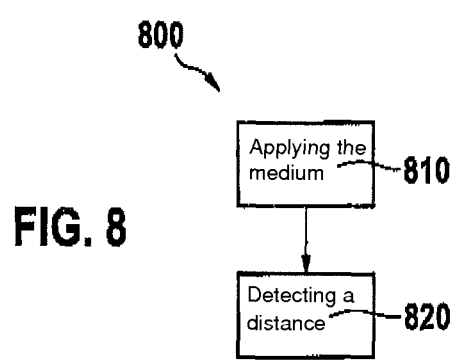

FIG. 8 shows a flow chart of a method 800 for determining a pressure of a medium located inside an electrochemical energy store according to one exemplary embodiment of the present invention. Method 800 has a step of applying 810 the medium to an electrically conductive layer, which is deflectable by the pressure of the medium to be determined. Method 800 also has a step of detecting 820 a distance, which is dependent on the pressure of the medium to be determined, between the electrically conductive layer and a detection unit, which is inductively coupled to the electrically conductive layer, with the aid of the detection unit in an inductive way, to determine the pressure of the medium from the distance. Method 800 may advantageously be executed in conjunction with, for example, the sensor device from one of FIGS. 1A through 6 and/or the electrochemical energy store from one of FIGS. 1A through 6.

The described exemplary embodiments shown in the figures are only selected as examples. Different exemplary embodiments may be combined with one another in their entirety or with respect to individual features. One exemplary embodiment may also be supplemented by features of another exemplary embodiment. Furthermore, method steps according to the present invention may be executed repeatedly and in a sequence different from the described sequence.

What is claimed is:

1. An electrochemical energy store, comprising:
    a housing inside which a medium may be released by an electrochemical reaction device;
    a diaphragm, with the aid of which a pressure relief opening of the housing is closed, the diaphragm having an electrically conductive layer and being configured to burst in a defined way in the event of a predetermined overpressure of the medium in the housing to discharge the medium through the pressure relief opening, and being deflectable by the medium; and
    a sensor device to determine a pressure of the inside the housing, the sensor device including a detection unit inductively coupled with the electrically conductive layer, the detection unit configured to inductively detect a distance, which is dependent on the pressure of the medium, between the layer and the detection unit, to determine the pressure of the medium from the distance;
    wherein the detection unit is situated on or in a section of a support element overlaying the diaphragm, wherein the support element is a circuit structure.

2. The electrochemical energy store as recited in claim 1, wherein the sensor device is fastened at least one of around the pressure relief opening, and around the diaphragm with respect to the electrically conductive layer, with the aid of a connection which fails at a pressure lower than or equal to the predetermined overpressure of the medium.

3. The electrochemical energy store as recited in claim 1, wherein the sensor device is fastened at least one of around the pressure relief opening, and around the diaphragm with respect to the electrically conductive layer, with the aid of at least one spacer element, which is permeable to the medium.

4. The electrochemical energy store as recited in claim 1, further comprising:
    a further electrically conductive layer and a further sensor device, which is situated in an area of inductive coupling with respect to the further electrically conductive layer, the further electrically conductive layer being separated from the medium and being deflectable by an ambient pressure.

5. The electrochemical energy store as recited in claim 1, wherein the electrochemical energy store has a plurality of battery cells, and the sensor device has a plurality of detection units and one analysis unit, a respective one of the plurality of detection units being attached to each of the plurality of battery cells, and the analysis unit being electrically connected to the plurality of detection units.

6. The electrochemical energy store as recited in claim 1, wherein the pressure relief opening is covered at an end thereof which faces away from the medium or faces toward surroundings outside of the store with the aid of the support element of the sensor device.

7. The electrochemical energy store as recited in claim 1, wherein the support element of the sensor device is situated on a surface of the housing facing away from the medium or facing toward surroundings outside of the store.

8. The electrochemical energy store as recited in claim 1, wherein the pressure relief opening is covered at an end thereof which faces away from the medium or faces toward surroundings outside of the store with the aid of the support element of the sensor device, and wherein the support element of the sensor device is situated on a surface of the housing facing away from the medium or facing toward surroundings outside of the store.

9. A method for manufacturing an electrochemical energy store, the method comprising:
    providing a housing, inside which a medium may be released by an electrochemical reaction device, the housing having a pressure relief opening, which is closed with the aid of a diaphragm, the diaphragm having an electrically conductive layer and being configured to burst in a defined way at a predetermined overpressure of the medium in the housing to discharge the medium through the pressure relief opening; and situating a sensor device in an area of inductive coupling with respect to the electrically conductive layer, the sensor device to determine a pressure of the inside the housing, the sensor device including a detection unit inductively coupled with the electrically conductive layer, the detection unit configured to inductively detect a distance, which is dependent on the pressure of the medium, between the layer and the detection unit, to determine the pressure of the medium from the distance;

wherein the detection unit is situated on or in a section of a support element overlaying the diaphragm, wherein the support element is a circuit structure.

10. The method as recited in claim 9, wherein the sensor device is fastened at least one of around the pressure relief opening, and around the diaphragm with respect to the electrically conductive layer, with the aid of a connection which fails at a pressure lower than or equal to the predetermined overpressure of the medium.

11. The method as recited in claim 9, wherein the sensor device is fastened at least one of around the pressure relief opening, and around the diaphragm with respect to the electrically conductive layer, with the aid of at least one spacer element, which is permeable to the medium.

12. The method as recited in claim 9, wherein there is a further electrically conductive layer and a further sensor device, which is situated in an area of inductive coupling with respect to the further electrically conductive layer, the further electrically conductive layer being separated from the medium and being deflectable by an ambient pressure.

13. The method as recited in claim 9, wherein the electrochemical energy store has a plurality of battery cells, and the sensor device has a plurality of detection units and one analysis unit, a respective one of the plurality of detection units being attached to each of the plurality of battery cells, and the analysis unit being electrically connected to the plurality of detection units.

14. The method as recited in claim 9, wherein the pressure relief opening is covered at an end thereof which faces away from the medium or faces toward surroundings outside of the store with the aid of the support element of the sensor device.

15. The method as recited in claim 9, wherein the support element of the sensor device is situated on a surface of the housing facing away from the medium or facing toward surroundings outside of the store.

16. The method as recited in claim 9, wherein the pressure relief opening is covered at an end thereof which faces away from the medium or faces toward surroundings outside of the store with the aid of the support element of the sensor device, and wherein the support element of the sensor device is situated on a surface of the housing facing away from the medium or facing toward surroundings outside of the store.

* * * * *